United States Patent
Pao et al.

(10) Patent No.: US 12,394,391 B2
(45) Date of Patent: Aug. 19, 2025

(54) EMOTION PERCEIVING ARTIFICIAL INTELLIGENCE MASK AND OPERATING METHOD

(71) Applicant: National Tsing Hua University, Hsinchu (TW)

(72) Inventors: Sheng-Ying Pao, Palo Alto, CA (US); Shun-Hsun Liang, Taipei (TW); Shih-Dun Liu, Palo Alto, CA (US)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 18/784,980

(22) Filed: Jul. 26, 2024

(65) Prior Publication Data

US 2025/0054459 A1    Feb. 13, 2025

(30) Foreign Application Priority Data

Aug. 8, 2023   (TW) .................................. 112129803

(51) Int. Cl.
*G09G 5/00* (2006.01)
*A41D 13/11* (2006.01)
*G06F 3/01* (2006.01)
*H02J 7/00* (2006.01)

(52) U.S. Cl.
CPC ............. *G09G 5/003* (2013.01); *A41D 13/11* (2013.01); *G06F 3/011* (2013.01); *H02J 7/0063* (2013.01); *G06F 2203/011* (2013.01); *G09G 2354/00* (2013.01); *G09G 2370/16* (2013.01)

(58) Field of Classification Search
CPC .............. G09G 5/003; G09G 2354/00; G09G 2370/16; A41D 13/11; G06F 3/011; G06F 2203/011; H02J 7/0063
See application file for complete search history.

(56) References Cited

U.S. PATENT DOCUMENTS

| | | | |
|---|---|---|---|
| 11,443,460 B2 * | 9/2022 | Caballero | G06T 11/00 |
| 2022/0071317 A1 * | 3/2022 | Isgar | A42B 3/30 |
| 2022/0343934 A1 * | 10/2022 | Lynch | G06V 40/166 |
| 2024/0104787 A1 * | 3/2024 | Ding | G06F 40/20 |

* cited by examiner

*Primary Examiner* — Pegeman Karimi

(57) ABSTRACT

An emotion perceiving artificial intelligence mask includes a processing circuit, a sensing circuit and a display circuit. The processing circuit includes a display control module and an artificial intelligence calculation module. The sensing circuit receives an emotion perceiving message and transmits the emotion perceiving message to the artificial intelligence calculation module. The artificial intelligence calculation module calculates and analyzes the emotion perceiving message to generate a multidimensional emotion perceiving index factor and transmit the multidimensional emotion perceiving index factor to the display control module. The display control module generates a dynamic display picture message according to the multidimensional emotion perceiving index factor. The display circuit receives the dynamic display picture message transmitted by the display control module and relatively displays an emotion perceiving dynamic picture. The intelligent mask provided by the present application has the function of displaying the emotional picture and effectively improves the user experience.

14 Claims, 2 Drawing Sheets

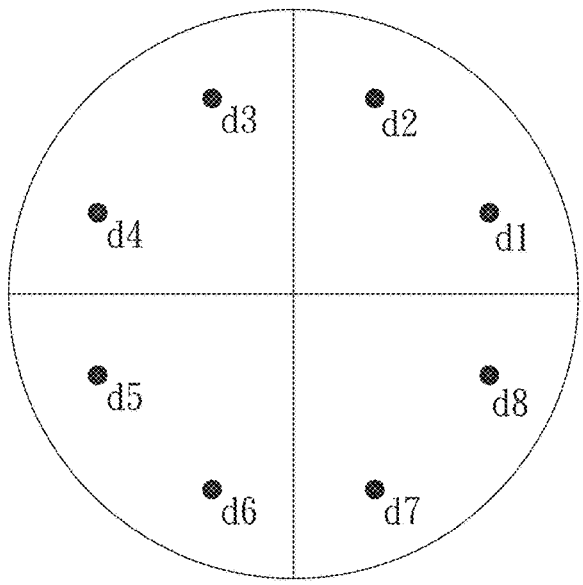

FIG. 2

| Receive, by the sensing circuit, a plurality of emotion perceiving messages and transmit, by the sensing circuit, the plurality of emotion perceiving messages to the artificial intelligence calculation module, where the artificial intelligence calculation module calculates and analyzes the plurality of emotion perceiving messages to generate a multidimensional emotion perceiving index factor and transmit the multidimensional emotion perceiving index factor to the display control module; and the display control module generates a dynamic display picture message according to the multidimensional emotion perceiving index factor | ~ S310 |

| Receive, by the display circuit, the dynamic display picture message transmitted by the display control module and relatively display, by the display circuit, an emotion perceiving dynamic picture | ~ S320 |

FIG. 3

EMOTION PERCEIVING ARTIFICIAL INTELLIGENCE MASK AND OPERATING METHOD

FIELD OF THE INVENTION

The present invention relates to a mask, and particularly relates to an emotion perceiving artificial intelligence mask and an operating method.

BACKGROUND OF THE INVENTION

In the current epidemic era, viruses will coexist with human. Wearing a mask is a standard configuration. In addition, the mask needs to be worn usually in environments such as hospitals, plants and kitchens. In such environments, he/she wearing the mask needs to communicate with people face to face. At present, studies suggest that facial expressions play a vital role in communication. However, the mask shields the half of the face, resulting in estrangement and misunderstanding during communication. In the European and American area, the mask also leads to negative feelings such as indifference and fear and becomes the killability in communication. Therefore, how to improve the indifference caused by a conventional mask by means of an artificial intelligence mask is the problem to be solved.

SUMMARY OF THE INVENTION

To overcome defects in the above art, the present invention provides an emotion perceiving artificial intelligence mask and an operating method.

An emotion perceiving artificial intelligence mask provided by the present invention, including:

- a processing circuit, including a display control module and an artificial intelligence calculation module, where the display control module is electrically connected to the artificial intelligence calculation module;
- a sensing circuit, electrically connected to the artificial intelligence calculation module and configured to receive a plurality of emotion perceiving messages and to transmit the emotion perceiving messages to the artificial intelligence calculation module, where the artificial intelligence calculation module calculates and analyzes the plurality of emotion perceiving messages to generate a multidimensional emotion perceiving index factor and transmit the multidimensional emotion perceiving index factor to the display control module, and the display control module generates a dynamic display picture message according to the multidimensional emotion perceiving index factor; and
- a display circuit, electrically connected to the display control module, where the display circuit receives the dynamic display picture message transmitted by the display control module and relatively displays an emotion perceiving dynamic picture.

An operating method provided by the present invention, applicable to an emotion perceiving artificial intelligence mask, where the emotion perceiving artificial intelligence mask includes a processing circuit, a sensing circuit and a display circuit; the processing circuit comprises a display control module and an artificial intelligence calculation module, where the display control module is electrically connected to the artificial intelligence calculation module, the sensing circuit is electrically connected to the artificial intelligence calculation module, the display circuit is electrically connected to the display control module; and the operating method includes the following steps:

- receiving, by the sensing circuit, a plurality of emotion perceiving messages and transmitting, by the sensing circuit, the plurality of emotion perceiving messages to the artificial intelligence calculation module, where the artificial intelligence calculation module calculates and analyzes the plurality of emotion perceiving messages to generate a multidimensional emotion perceiving index factor and transmit the multidimensional emotion perceiving index factor to the display control module; and the display control module generates a dynamic display picture message according to the multidimensional emotion perceiving index factor; and
- receiving, by the display circuit, the dynamic display picture message transmitted by the display control module and relatively displaying, by the display circuit, an emotion perceiving dynamic picture.

The present invention provides an emotion perceiving artificial intelligence mask. The artificial intelligence algorithm built in the artificial intelligence calculation module receives voice data or myoelectric numerical values received by the sensing circuit for emotion recognition, the voice data or myoelectric numerical values are imported into the machine learning model for real-time operation with a light software architecture, and emotions such as joy, excitement, sadness and anger are specially distinguished from emotions related to communication. In particular, the emotion index numerical values regressed by expression classification related to mouth and nose are subjected to the sensing circuit and artificial intelligence operation processing, the generated numerical values are sent to the display control module on the surface of the mask and are calculated to form the dynamic display picture message, and the dynamic display picture message is transmitted to the display circuit to show corresponding expressions, so that the mask which seems to be indifferent is converted into a future mask with the milk of human kindness. The wireless communication circuit is also capable to receive and transmit a terminal signal to the electronic device, so that the display control module generates the dynamic display picture message according to the multidimensional emotion perceiving factor. The wireless communication circuit is also capable to assist update of firmware of the artificial intelligence mask and to reversely write updated data of the electronic device in the processing circuit. As far as a user is concerned, the user still can convey expressions during communication in the mask wearing environment. A part of emotion index numerical values are transmitted to a mobile terminal such as a personal mobile device and peripheral masks for edge computing through a low power consumption Bluetooth communication protocol used by the wireless communication circuit, whereby updating the machine learning model according to personal data and switching different modes to customize expression strength by the user. The expressions are hidden if necessary. By virtue of the real-time operating and peripheral operating functions, the emotion recognition artificial intelligence mask exchanges data with peripheral masks while receiving emotion signals to enhance future emotion operating and wearing technology in the post-epidemic era, so that the user experience is effectively enhanced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 is a schematic diagram of a multidimensional emotion perceiving index provided by an embodiment of the present invention; and FIG. 3 is a flow chart of an operating method applied to the emotion perceiving artificial intelligence mask provided by an embodiment of the present invention.

DETAILED DESCRIPTION OF PREFERRED EMBODIMENTS

Figure 1:
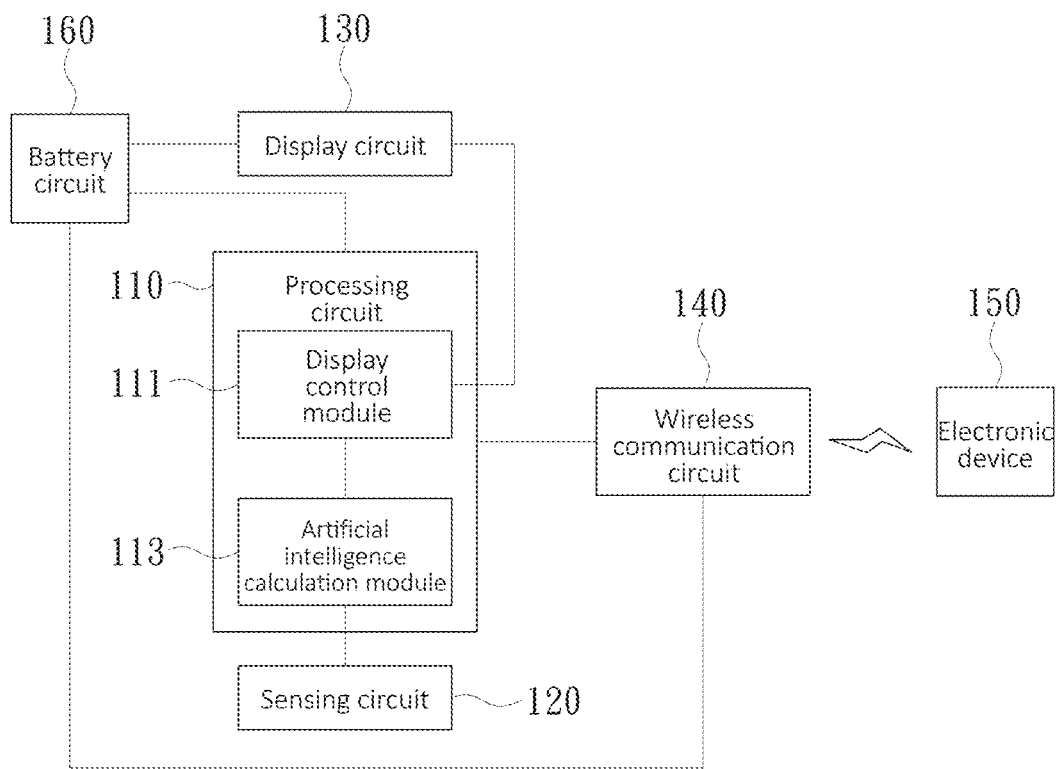
FIG. 1 is a block diagram of an emotion perceiving artificial intelligence mask provided by an embodiment of the present invention.

The present invention will be described in detail below by means of various embodiments of the present invention in combination with drawings. However, the concept of the present invention may be reflected in many different forms and shall not be construed as being limited to the exemplary embodiment described herein. In addition, same reference numbers in the drawings can be used for representing similar assemblies.

Refer to FIG. 1 and FIG. 2. FIG. 1 is a block diagram of an emotion perceiving artificial intelligence mask provided by an embodiment of the present invention. FIG. 2 is a schematic diagram of a multidimensional emotion perceiving index provided by an embodiment of the present invention. An emotion perceiving artificial intelligence mask 100 includes a processing circuit 110, a sensing circuit 120, and a display circuit 130. Further, the processing circuit 110 includes a display control module 111 and an artificial intelligence calculation module 113. The display control module 111 is electrically connected to the artificial intelligence calculation module 113. The sensing circuit 120 is electrically connected to the artificial intelligence calculation module 113. The display circuit 130 is electrically connected to the display control module 111.

In an embodiment, the sensing circuit 120 is configured to receive a plurality of emotion perceiving messages and transmit the emotion perceiving messages to the artificial intelligence calculation module 113. For example, the sensing circuit 120 at least includes a sound sensing module, a temperature sensing module, a humidity sensing module, a myoelectric sensing module, or an odor sensing module. The sound sensing module can be a microphone or a sound receiver and is configured to receive sounds of a user. The temperature sensing module is configured to sense an indoor or outdoor temperature. The humidity sensing module is configured to sense environmental humidity. The myoelectric sensing module includes a plurality of electronic assemblies including bipolar junction transistors (BJT) or metal oxide semiconductors (MOS), and is configured to sense facial muscle expressions of the user, for example, mouth expressions of the user who smells, gets angry or talks. The odor sensing module is configured to sense an odor diffused by the user who talks. The artificial intelligence calculation module 113 calculates and analyzes the plurality of emotion perceiving messages to generate a multidimensional emotion perceiving index factor and transmit the multidimensional emotion perceiving index factor to the display control module 111. The artificial intelligence calculation module 113 has the built-in artificial intelligence algorithm for emotion recognition, emotions are imported into the machine learning model established by means of the artificial intelligence algorithm for real-time operation with the light software architecture (for example, a TinyML architecture), and the TinyML architecture can optimize the working load of machine learning and consumes low power. Emotions such as joy, excitement, sadness and anger of the user communicating with others through the mask are specially distinguished. Referring to FIG. 2, the artificial intelligence calculation module 113 calculates and analyzes the plurality of emotion perceiving messages comprehensively generated by the sound sensing module, the temperature sensing module, the humidity sensing module, the myoelectric sensing module or the odor sensing module to generate the two-dimensional emotion perceiving index factor. For example, d1 represents happiness, d2 represents excitement, d3 represents anger, d4 represents fear, d5 represents sadness, d6 represents depression, d7 represents quietness and peacefulness and d8 represents satisfaction. The emotion perceiving artificial intelligence mask 100 provided by the present application can exchange data with all adjacent intelligent masks through the plurality of emotion perceiving messages received by the sensing circuit 120 for interaction, so that the user experience is effectively improved.

In an embodiment, the display control module 111 generates the dynamic display picture message according to the multidimensional emotion perceiving factor. The display circuit 130 receives the dynamic display picture message transmitted by the display control module 111 and relatively displays the emotion perceiving dynamic picture. For example, when the user pouts or gets angry, after the artificial intelligence algorithm built in the artificial intelligence calculation module 113 recognizes the emotion, the emotion perceiving dynamic picture is relatively displayed through the display circuit 130. For example, the display control module 111 can be a display driving circuit. The display circuit 130 can include a plurality of light emitting assemblies. The light emitting assemblies can respectively display any expression of the user in the above d1-d8 and dynamically display the picture message relatively.

In an embodiment, the emotion perceiving artificial intelligence mask 100 further includes a wireless communication circuit 140, the wireless communication circuit 140 being electrically connected to the processing circuit 110. The wireless communication circuit 140 can adopt the low power consumption Bluetooth communication protocol with the transmission distance reaching hundreds of meters. For example, in an exhibition, a plurality of users wearing the emotion perceiving artificial intelligence mask 100 are in communication connection, and special dynamic pictures can be relatively displayed on the display circuit 130 to represent communication of the plurality of users. For example, after sounds received by the sound sensing module of the sensing circuit 120 are subjected to language identification by the artificial intelligence calculation module 113, characters are displayed by the light emitting assemblies of the display circuit 130 on the surfaces of the masks, so that communication inconvenience due to small volume as the mouths are shielded by the masks is overcome. By soft tones of the users, the characters subjected to language identification can be directly displayed on the light emitting assemblies dynamically. The wireless communication circuit 140 is configured to be connected to the electronic device 150 and to transmit a control signal to the electronic device or to receive a control signal from the electronic device. The wireless communication circuit 140 controls a calculation analysis function of the artificial intelligence calculation module 113 and/or the dynamic display picture message generated by the display control module 111 by means of the control signal. The electronic device 150 is a mobile device, an edge computing device or at least another motion perceiving artificial intelligence mask 100. For example, the mobile device can be a smart phone, a tablet personal computer or a notebook computer, and the edge computing device can be a server with an altitude operating function. In other words, the wireless communication circuit 140 is also capable to assist update of the firmware of the artificial intelligence mask 100 and to reversely write updated data of the electronic device 150 in the artificial intelligence calculation module 113 of the processing circuit 110, so that the functionality is effectively improved.

In an embodiment, the emotion perceiving artificial intelligence mask 100 further includes a battery circuit 160, the battery circuit 160 being electrically connected to the processing circuit 110, the sensing circuit 120, the display circuit 130 and the wireless communication circuit 140. The battery circuit 160 is configured to provide electric energy to the processing circuit 110, the sensing circuit 120, the display circuit 130 and the wireless communication circuit 140. The battery circuit 160 includes a main power supply module, a standby power supply module, a solar module and a charging module, and the battery circuit 160 switches one of the main power supply module, the standby power supply module, the solar module and the charging module according to power consuming efficiency to supply power to the emotion perceiving artificial intelligence mask 100, so that the power consuming efficiency is improved. For example, the main power supply module and the standby power supply module can be lithium batteries. The solar module can be a small polar panel. The charging module can be a USB interface or a TYPE-C interface. For example, the emotion perceiving artificial intelligence mask 100 can be integrally formed. The emotion perceiving artificial intelligence mask 100 can be attached to an ordinary mask in a pasted manner through a velcro. The emotion perceiving artificial intelligence mask 100 can be attached to the ordinary mask in a clamped manner through a clamp, so that the convenience is effectively improved.

Referring to FIG. 3, FIG. 3 is a flow chart of an operating method applied to the emotion perceiving artificial intelligence mask provided by an embodiment of the present invention. An operating method, applicable to an emotion perceiving artificial intelligence mask, where the emotion perceiving artificial intelligence mask includes a processing circuit, a sensing circuit and a display circuit; the processing circuit includes a display control module and an artificial intelligence calculation module, where the display control module is electrically connected to the artificial intelligence calculation module, the sensing circuit is electrically connected to the artificial intelligence calculation module, and the display circuit is electrically connected to the display control module; and the operating method includes the following steps:

S310: receiving, by the sensing circuit, a plurality of emotion perceiving messages and transmitting, by the sensing circuit, the plurality of emotion perceiving messages to the artificial intelligence calculation module, where the artificial intelligence calculation module calculates and analyzes the plurality of emotion perceiving messages to generate a multidimensional emotion perceiving index factor and transmit the multidimensional emotion perceiving index factor to the display control module; and the display control module generates a dynamic display picture message according to the multidimensional emotion perceiving index factor; and S320: receiving, by the display circuit, the dynamic display picture message transmitted by the display control module and relatively displaying, by the display circuit, an emotion perceiving dynamic picture.

In an embodiment, the sensing circuit of the emotion perceiving artificial intelligence mask at least includes a sound sensing module, a temperature sensing module, a humidity sensing module, a myoelectric sensing module or an odor sensing module. The operating method includes the following steps:

calculating and analyzing, by the artificial intelligence calculation module, the plurality of emotion perceiving messages generated by the sound sensing module, a temperature sensing module, a humidity sensing module, a myoelectric sensing module or an odor sensing module to generate a two-dimensional emotion perceiving index factor.

In an embodiment, the emotion perceiving artificial intelligence mask further includes a wireless communication circuit, the wireless communication circuit being electrically connected to the processing circuit; and the operating method includes the following step:

connecting the wireless communication circuit to an electronic device, and transmitting, by the wireless communication circuit, a control signal to the electronic device or receiving, by the wireless communication circuit, a control signal from the electronic device, where the wireless communication circuit controls a calculation analysis function of the artificial intelligence calculation module and/or the dynamic display picture message generated by the display control module by means of the control signal; and the electronic device is a mobile device, an edge computing device or at least another emotion perceiving artificial intelligence mask.

In an embodiment, the emotion perceiving artificial intelligence mask further includes a battery circuit, the battery circuit being electrically connected to the processing circuit, the sensing circuit, the display circuit and the wireless communication circuit; and the operating method includes the following step:

providing, by the battery circuit, electric energy to the processing circuit, the sensing circuit, the display circuit and the wireless communication circuit, where the battery circuit includes a main power supply module, a standby power supply module, a solar module and a charging module, and the battery circuit switches one of the main power supply module, the standby power supply module, the solar module and the charging module according to power consuming efficiency to supply power to the emotion perceiving artificial intelligence mask.

In an embodiment, the emotion perceiving artificial intelligence mask is integrally formed; the emotion perceiving artificial intelligence mask is attached to an ordinary mask in a pasted manner; and the emotion perceiving artificial intelligence mask is attached to an ordinary mask in a clamped manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An emotion perceiving artificial intelligence mask, comprising:

a processing circuit, comprising a display control module and an artificial intelligence calculation module, wherein the display control module is electrically connected to the artificial intelligence calculation module;

a sensing circuit, electrically connected to the artificial intelligence calculation module, wherein the sensing circuit is configured to receive a plurality of emotion perceiving messages and transmit the emotion perceiving messages to the artificial intelligence calculation module, wherein the processing circuit calculates and analyzes the emotion perceiving messages to generate a multidimensional emotion perceiving index factor and transmit the multidimensional emotion perceiving index factor to the display control module, and the processing circuit generates a dynamic display picture message according to the multidimensional emotion perceiving index factor; and a display circuit, electrically connected to the display control module, wherein the display circuit is configured to receive the dynamic display picture message transmitted by the display control module and relatively display an emotion perceiving dynamic picture.

2. The emotion perceiving artificial intelligence mask according to claim 1, wherein the sensing circuit at least comprises a sound sensing module, a temperature sensing module, a humidity sensing module, a myoelectric sensing module or an odor sensing module, and the processing circuit calculates and analyzes the plurality of emotion perceiving messages generated by the sound sensing module, the temperature sensing module, the humidity sensing module, the myoelectric sensing module or the odor sensing module to generate a two-dimensional emotion perceiving index factor.

3. The emotion perceiving artificial intelligence mask according to claim 2, further comprising:

a battery circuit, electrically connected to the processing circuit, the sensing circuit, the display circuit, and the wireless communication circuit, wherein the battery circuit is configured to provide electric energy to the processing circuit, the sensing circuit, the display circuit, and the wireless communication circuit, the battery circuit comprises a main power supply module, a standby power supply module, a solar module, and a charging module, the battery circuit is configured to switch one of the main power supply module, the standby power supply module, the solar module, and the charging module according to power consuming efficiency to supply power to the emotion perceiving artificial intelligence mask.

4. The emotion perceiving artificial intelligence mask according to claim 1, further comprising:

a wireless communication circuit, electrically connected to the processing circuit, wherein the wireless communication circuit is configured to be connected to an electronic device and transmit a control signal to the electronic device or to receive a control signal from the electronic device, the wireless communication circuit controls a calculation analysis function of the artificial intelligence calculation module and/or the dynamic display picture message generated by the display control module by means of the control signal, and the electronic device is a mobile device, an edge computing device, or at least another emotion perceiving artificial intelligence mask.

5. The emotion perceiving artificial intelligence mask according to claim 4, further comprising:

a battery circuit, electrically connected to the processing circuit, the sensing circuit, the display circuit, and the wireless communication circuit, wherein the battery circuit is configured to provide electric energy to the processing circuit, the sensing circuit, the display circuit, and the wireless communication circuit, the battery circuit comprises a main power supply module, a standby power supply module, a solar module, and a charging module, the battery circuit is configured to switch one of the main power supply module, the standby power supply module, the solar module, and the charging module according to power consuming efficiency to supply power to the emotion perceiving artificial intelligence mask.

6. The emotion perceiving artificial intelligence mask according to claim 1, further comprising:

a battery circuit, electrically connected to the processing circuit, the sensing circuit, the display circuit, and the wireless communication circuit, wherein the battery circuit is configured to provide electric energy to the processing circuit, the sensing circuit, the display circuit, and the wireless communication circuit, the battery circuit comprises a main power supply module, a standby power supply module, a solar module, and a charging module, the battery circuit is configured to switch one of the main power supply module, the standby power supply module, the solar module, and the charging module according to power consuming efficiency to supply power to the emotion perceiving artificial intelligence mask.

7. The emotion perceiving artificial intelligence mask according to claim 1, wherein the emotion perceiving artificial intelligence mask is integrally formed, the emotion perceiving artificial intelligence mask is attached to an ordinary mask in a pasted manner, or the emotion perceiving artificial intelligence mask is attached to an ordinary mask in a clamped manner.

8. An operating method, applicable to an emotion perceiving artificial intelligence mask, wherein the emotion perceiving artificial intelligence mask comprises a processing circuit, a sensing circuit, and a display circuit, the processing circuit comprises a display control module and an artificial intelligence calculation module, the display control module is electrically connected to the artificial intelligence calculation module, the sensing circuit is electrically connected to the artificial intelligence calculation module, the display circuit is electrically connected to the display control module, and the operating method comprises the following steps:

configuring the sensing circuit to receive a plurality of emotion perceiving messages and transmit the plurality of emotion perceiving messages to the artificial intelligence calculation module, configuring the processing circuit to calculate and analyze the plurality of emotion perceiving messages to generate a multidimensional emotion perceiving index factor and transmit the multidimensional emotion perceiving index factor to the display control module, and configuring the processing circuit to generate a dynamic display picture message according to the multidimensional emotion perceiving index factor; and configuring the display circuit to receive the dynamic display picture message transmitted by the display control module and relatively display an emotion perceiving dynamic picture.

9. The operating method according to claim 8, wherein the sensing circuit of the emotion perceiving artificial intelligence mask at least comprises a sound sensing module, a temperature sensing module, a humidity sensing module, a myoelectric sensing module or an odor sensing module, and the operating method comprises the following step:

configuring the processing circuit to calculate and analyze the plurality of emotion perceiving messages generated by the sound sensing module, the temperature sensing module, the humidity sensing module, the myoelectric sensing module or the odor sensing module to generate a two-dimensional emotion perceiving index factor.

10. The operating method according to claim 9, wherein the emotion perceiving artificial intelligence mask further comprises a battery circuit, the battery circuit is electrically connected to the processing circuit, the sensing circuit, the display circuit, and the wireless communication circuit, and the operating method comprises the following step:

configuring the battery circuit to provide electric energy to the processing circuit, the sensing circuit, the display circuit, and the wireless communication circuit, wherein the battery circuit comprises a main power supply module, a standby power supply module, a solar module, and a charging module, and the battery circuit is configured to switch one of the main power supply module, the standby power supply module, the solar module, and the charging module according to power consuming efficiency to supply power to the emotion perceiving artificial intelligence mask.

11. The operating method according to claim 8, wherein the emotion perceiving artificial intelligence mask further comprises a wireless communication circuit, the wireless communication circuit is electrically connected to the processing circuit, and the operating method comprises the following step:

configuring the wireless communication circuit to be connected to an electronic device, transmit a control signal to the electronic device, or receive a control signal from the electronic device, wherein the wireless communication circuit controls a calculation analysis function of the artificial intelligence calculation module and/or the dynamic display picture message generated by the display control module by means of the control signal, and the electronic device is a mobile device, an edge computing device, or at least another emotion perceiving artificial intelligence mask.

12. The operating method according to claim 11, wherein the emotion perceiving artificial intelligence mask further comprises a battery circuit, the battery circuit is electrically connected to the processing circuit, the sensing circuit, the display circuit, and the wireless communication circuit, and the operating method comprises the following step:

configuring the battery circuit to provide electric energy to the processing circuit, the sensing circuit, the display circuit, and the wireless communication circuit, wherein the battery circuit comprises a main power supply module, a standby power supply module, a solar module, and a charging module, and the battery circuit is configured to switch one of the main power supply module, the standby power supply module, the solar module, and the charging module according to power consuming efficiency to supply power to the emotion perceiving artificial intelligence mask.

13. The operating method according to claim 8, wherein the emotion perceiving artificial intelligence mask further comprises a battery circuit, the battery circuit is electrically connected to the processing circuit, the sensing circuit, the display circuit, and the wireless communication circuit, and the operating method comprises the following step:

configuring the battery circuit to provide electric energy to the processing circuit, the sensing circuit, the display circuit, and the wireless communication circuit, wherein the battery circuit comprises a main power supply module, a standby power supply module, a solar module, and a charging module, and the battery circuit is configured to switch one of the main power supply module, the standby power supply module, the solar module, and the charging module according to power consuming efficiency to supply power to the emotion perceiving artificial intelligence mask.

14. The operating method according to claim 8, wherein the emotion perceiving artificial intelligence mask is integrally formed, the emotion perceiving artificial intelligence mask is attached to an ordinary mask in a pasted manner, or the emotion perceiving artificial intelligence mask is attached to an ordinary mask in a clamped manner.

\* \* \* \* \*